Patented Aug. 7, 1934

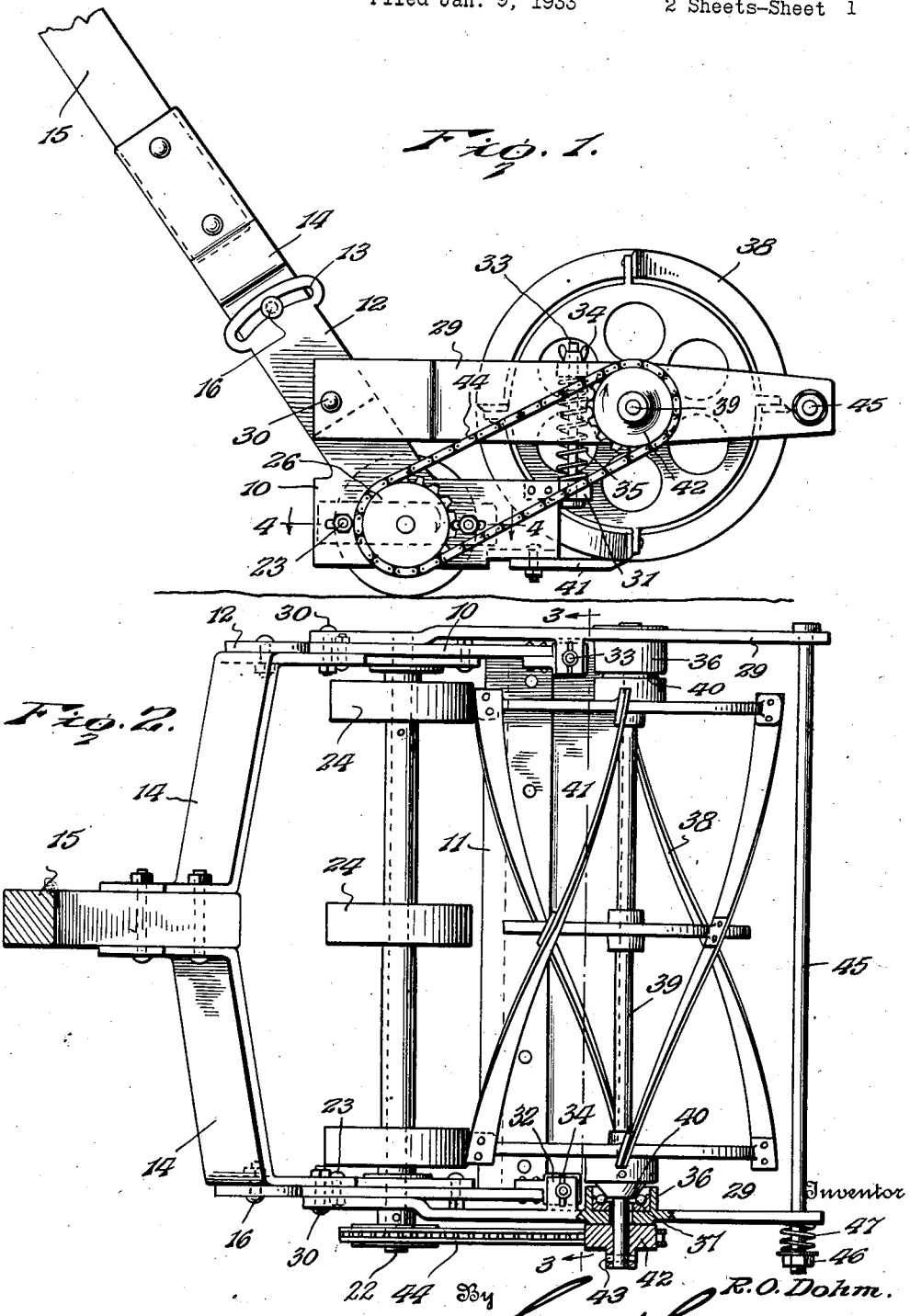

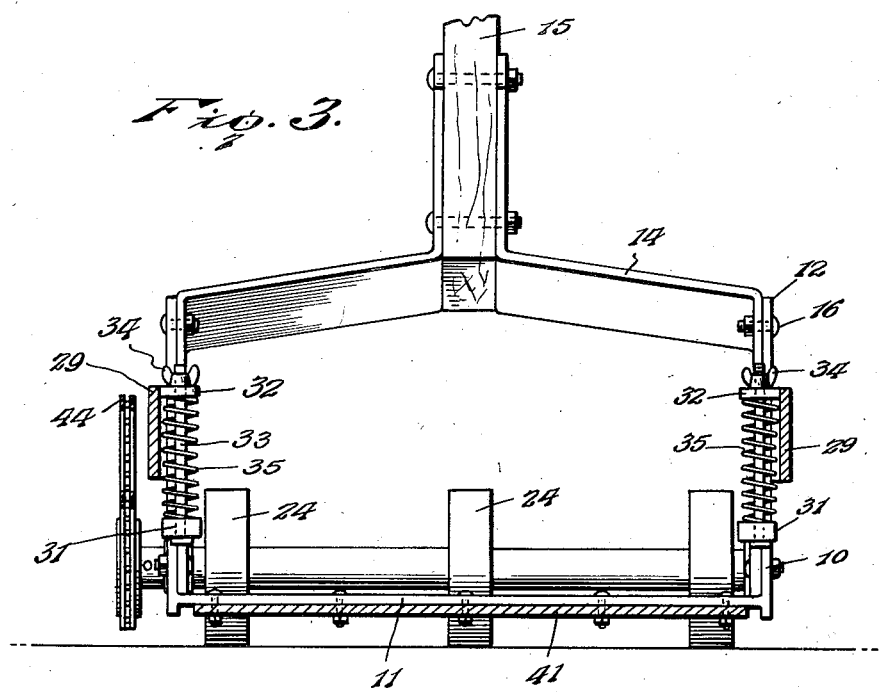
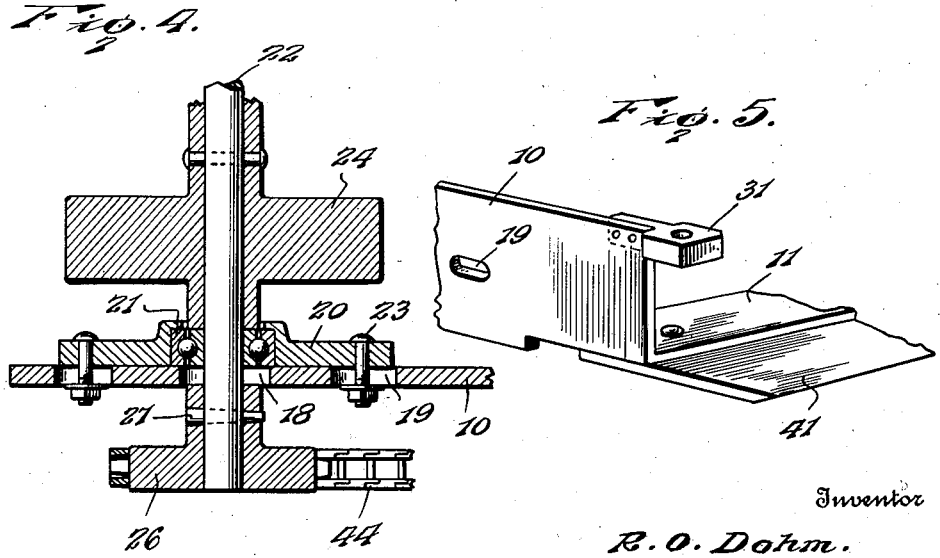

1,969,211

UNITED STATES PATENT OFFICE 1,969,211

LAWN MOWER

Robert O. Dohm, Dane, Wis.

Application January 9, 1933, Serial No. 650,882

5 Claims. (Cl. 56—252)

This invention relates to an improved lawn mower and seeks, among other objects, to provide a device of this character which will trim close to fences, buildings, bushes or the like.

A further object of the invention is to provide a mower wherein the traction wheels will be located behind the cutting reel of the mower, so that said wheels will not knock down the grass before it can be cut.

The invention seeks, as a further object, to provide a mower wherein wear on the bearings of the reel will be automatically taken up so that the reel will always run true and wherein the means employed for taking up such wear will provide a guard for the reel.

And the invention seeks, as a still further object, to provide a mower which will be characterized by structural simplicity and which will be light in weight.

Other and incidental objects of the invention, not specifically mentioned in the foregoing, will be apparent during the course of the following description.

In the drawings:

Figure 1 is a side elevation of my improved mower,

Figure 2 is a plan view of the mower,

Figure 3 is a vertical sectional view on the line 3—3 of Figure 2, the reel being omitted, Figure 4 is a detail section on the line 4—4 of Figure 1, and Figure 5 is a fragmentary perspective view of one of the front corners of the mower frame.

In carrying the invention into effect, I employ a frame embodying parallel side bars 10 which are connected at their forward ends by a cross bar 11 spaced upwardly somewhat, as brought out in Figure 5, above the lower edges of the side bars. Rising from the rear end portions of the side bars are handle bars 12 which extend upwardly and rearwardly at an oblique angle to the side bars and are provided at their upper ends with transverse arcuate slots 13. Pivoted at their lower ends to said bars, by bolts 30, are handle straps 14 offset towards each other to provide parallel terminals between which is bolted an appropriate handle 15. Thus the straps 14 may be rocked upon the bolts 30 for adjustably raising or lowering the handle 15, and extending through the lower end portions of the straps and through the slots 13 are bolts 16 securing the handle in adjusted position.

Formed in the side bars 10 of the frame, beneath the base ends of the handle bars 12, as particularly seen in Figure 4, are longitudinal slots 18 at opposite sides of which are slots 19 and overlying said slots at the inner sides of the side bars are housing plates 20. These plates carry bearings 21 and journaled through said bearings is a drive axle 22 the ends of which are freely accommodated in the slots 18. Extending through the plates 20 and freely through the slots 19 are bolts 23 adjustably connecting the plates with the side bars of the frame, and suitably fixed to or otherwise mounted upon the axle 22 are transversely spaced traction wheels 24. If preferred, a single traction roller may be substituted in lieu of said wheels. At one end, the axle 22 is extended beyond the adjacent side bar of the frame and fixed to said end of the axle is a sprocket 26. Removably securing the sprocket on the axle is a pin 27.

Pivotally mounted upon the handle bars 12 of the frame are forwardly projecting arms 29 connected to said bars by the bolts 30 and, as will be observed, the forward end portions of said arms are offset and extend in parallel relation. Fixed to the upper forward corners of the side bars 10 of the frame, as particularly seen in Figure 5, are forwardly projecting lugs 31 and formed on the arms 29, at their upper edges, to overhang said lugs, are lugs 32. Extending freely through the lugs 31 and 32 are vertically disposed bolts 33 preferably equipped at their upper ends with wing nuts 34, and surrounding the bolts between the lugs are springs 35 yieldably supporting the arms 29.

Forwardly of the plane of the lugs 32, the arms 29 are provided on their inner sides with annular housings 36 and removably fixed in said housings are corresponding members 37 of suitable cone bearings. Rotatably supported by these bearings is a cutting reel 38 having the usual spiral blades and embodying a shaft 39 journaled through said bearings. Suitably fixed upon said shaft are cones 40 coacting with the balls interposed between the cones and the members 37 of the bearings so that, as will be seen, the reel will be supported for free turning movement upon the arms 29. Bolted or otherwise removably secured against the lower face of the cross bar 11 of the frame is a knife 41 disposed to coact with the blades of the reel 38.

At one end, the reel shaft 39 is, as seen in Figure 2, extended to project freely through the adjacent reel-supporting arm 29 and is equipped with a sprocket 42 secured in place by a pin 43, and trained around said sprocket and the sprocket 26 is a sprocket chain 44. Thus, when the mower is pushed forwardly over the ground and the traction wheels 24 are accordingly caused to turn the shaft 22, the reel 38 will, as will be seen, be revolved to coact with the knife 41 to effect the cutting operation. Extending freely through the arms 29, near their forward ends, is a rod 45 provided at one end with a head to coact with one of said arms while at its opposite end said rod is equipped with a nut 46 and interposed between said nut and the other of said arms 29 is a spring 47. As will be observed, this spring will serve to constantly press the forward ends of the arms towards each other for taking up wear in the reel bearings while, also, the rod 45 will provide a guard in front of the cutting reel 38.

Attention is now directed to the fact that the entire weight of the mower is supported by the traction wheels 24 and as these wheels are located behind the cutting reel 38 and knife 41, the wheels will not encounter the grass before it is cut. Accordingly, crushing of uncut grass, as now experienced with ordinary lawn mowers, will be obviated. Furthermore, it is to be noted that the end of the mower opposite the sprocket chain 44 terminates substantially flush with the adjacent reel-supporting arm 29 so that the mower may be operated close to a fence or other obstruction for cutting the grass close to the fence. The springs 35 will, of course, be of sufficient tension to support the arms 29 under the weight of the cutting reel 38 so that the blades of said reel will effectually coact with the knife 41. Should said blades or the knife wear, however, such wear may readily be taken up by adjusting the nuts 34 of the bolts 33 and consequently swinging the arms downwardly to lower the reel. Wear in the sprocket chain 44 may be taken up with equal ease by shifting the housing plates 20.

Having thus described the invention, I claim:

1. A lawn mower including a frame having side bars, a cross bar connecting the front ends of the side bars and handle bars rising from the side bars, a knife carried by the cross bar, traction means carried by the side bars and disposed at the rear of the knife, arms pivoted to and extending forward from the handle bars above the side bars and the cross bar, a reel rotatably supported by said arms, means between the side bars and the arms yieldably sustaining the arms and supporting the reel to coact with the knife, and a driving connection between said traction means and the reel.

2. A lawn mower including a frame having side bars, a cross bar connecting the front ends of the side bars and handle bars rising from the side bars, a knife carried by the cross bar, traction means carried by the side bars and disposed at the rear of the knife, arms pivoted to and extending forwardly from the handle bars above the cross bar, a reel rotatably supported by said arms, expansion springs carried by and between the side bars and the arms sustaining the arms and supporting the reel to coact with the knife, a driving connection between said traction means and the reel, and means for adjusting the arms downwardly against the tension of the springs and lowering the reel to take up wear on the reel and knife.

3. A lawn mower including a frame having side bars, a cross bar connecting the side bars and handle bars rising from the side bars, a knife carried by the cross bar, traction means carried by the side bars at the rear of the knife, arms pivoted upon the handle bars and extending forwardly therefrom above the cross bar, a reel rotatably supported by said arms to coact with the knife, bearings for the reel including parts carried by said arms, a connection between the front ends of the arms, yieldable means carried by said connection pressing the arms towards each other for taking up wear in said bearings, and a driving connection between said traction means and the reel.

4. A lawn mower including a frame having side bars, a cross bar connecting the side bars and handle bars rising from the side bars, a knife carried by the cross bar, traction means carried by the side bars at the rear of the knife, arms pivoted upon the handle bars and extending forwardly therefrom above the cross bar, a reel rotatably supported by said arms to coact with the knife, bearings for the reel including parts carried by said arms, a rod extending between the forward ends of said arms in front of the reel to provide a guard for the reel and connect the arms, a spring carried by one end of the rod and bearing against the outer side of the adjacent arm to press the arms toward each other for taking up wear in said bearings, and a driving connection between said traction means and the reel.

5. A lawn mower including a frame having side bars, a cross bar connecting the side bars and handle bars rising from the side bars, a knife carried by the cross bar, traction means carried by the side bars at the rear of the knife, arms pivoted to the handle bars and extending forwardly therefrom above the cross bar, a reel rotatably suported by said arms, lugs on the arms, lugs on the front ends of the side bars, expansion springs interposed between said lugs and yieldably sustaining the arms to support the reel to coact with the knife, means extending between the lugs and adjustable for compressing said springs and lowering the reel to take up wear on the reel and knife, and a driving connection between said traction means and the reel.

ROBERT O. DOHM. [L. S.]